(12) United States Patent
Tanksale et al.

(10) Patent No.: US 8,984,025 B1
(45) Date of Patent: Mar. 17, 2015

(54) METHOD AND APPARATUS FOR PROCESSING A TRANSFORM FUNCTION, A REFERENCE FILE AND PARAMETER INFORMATION THAT REPRESENT A DATA FILE

(75) Inventors: Deepak Tanksale, Maharashtra (IN);
Srineet Sridharan, Maharashtra (IN);
Basant Rajan, Pune (IN)

(73) Assignee: Symantec Corporation, Mountain View, CA (US)

( * ) Notice: Subject to any disclaimer, the term of this patent is extended or adjusted under 35 U.S.C. 154(b) by 568 days.

(21) Appl. No.: 12/165,061

(22) Filed: Jun. 30, 2008

(51) Int. Cl.
*G06F 7/00* (2006.01)
*G06F 17/30* (2006.01)

(52) U.S. Cl.
USPC .......................................... 707/804; 707/679

(58) Field of Classification Search
CPC .......................................................... G06F 5/01
See application file for complete search history.

(56) References Cited

U.S. PATENT DOCUMENTS

| | | | | |
|---|---|---|---|---|
| 5,583,665 A * | 12/1996 | Gregory et al. | ............... | 358/504 |
| 5,813,017 A * | 9/1998 | Morris | ................... | 1/1 |
| 5,987,094 A * | 11/1999 | Clarke et al. | .................... | 378/62 |
| 6,199,064 B1 * | 3/2001 | Schindler | ............................. | 1/1 |
| 6,526,178 B1 * | 2/2003 | Fukuhara | ....................... | 382/249 |
| 2002/0047899 A1 * | 4/2002 | Son et al. | ........................ | 348/114 |
| 2003/0187853 A1 * | 10/2003 | Hensley et al. | .................. | 707/10 |
| 2004/0088313 A1 * | 5/2004 | Torres | ............................ | 707/101 |
| 2004/0225655 A1 * | 11/2004 | Moulton | ............................ | 707/6 |
| 2005/0033777 A1 * | 2/2005 | Moraes et al. | ................. | 707/202 |
| 2006/0230014 A1 * | 10/2006 | Kedem et al. | ....................... | 707/1 |
| 2006/0230081 A1 * | 10/2006 | Craswell et al. | ............... | 707/204 |
| 2006/0271528 A1 * | 11/2006 | Gorelik | .............................. | 707/3 |
| 2007/0192302 A1 * | 8/2007 | Qamhiyah et al. | ................ | 707/3 |
| 2007/0276886 A1 * | 11/2007 | Ishikawa et al. | .............. | 707/204 |
| 2007/0282907 A1 * | 12/2007 | Chambers | ................... | 707/104.1 |
| 2007/0288533 A1 * | 12/2007 | Srivastava et al. | ............. | 707/203 |
| 2008/0097990 A1 * | 4/2008 | Mustafa | ............................. | 707/5 |
| 2008/0154928 A1 * | 6/2008 | Bashyam et al. | .............. | 707/101 |

OTHER PUBLICATIONS

Nick Kingsbury; The Dual-Tree Complete Wavelet Transform: A New Efficient Tool for Image Restoration and Enhancement; 1998; University of Cambridge; pp. 1-4.*

* cited by examiner

*Primary Examiner* — Shew-Fen Lin
*Assistant Examiner* — Jermaine Mincey
(74) *Attorney, Agent, or Firm* — Campbell Stephenson LLP

(57) ABSTRACT

A method and apparatus for processing a transform function and parameter information to represent data files is described. In one embodiment, the method includes processing at least one data file to identify a reference file, a transform function and parameter information and storing the transform function and the parameter information, wherein the transform function and the parameter information is applied to the reference file to create the at least one data file.

24 Claims, 3 Drawing Sheets

# METHOD AND APPARATUS FOR PROCESSING A TRANSFORM FUNCTION, A REFERENCE FILE AND PARAMETER INFORMATION THAT REPRESENT A DATA FILE

BACKGROUND OF THE INVENTION

1. Field of the Invention

Embodiments of the present invention generally relate to data protection and storage systems and, more particularly, to a method and apparatus for processing a transform function and parameter information that represent data files and achieve a reduction of an amount of storage space required for backup and restoration of the data files.

2. Description of the Related Art

In various industries, a large number of data files are created and stored for different applications. The data files may be auto-generated files, such as two dimensional and/or three dimensional image files, video files, and the like. In order to store such auto-generated files, a significant amount of storage space is required. For example, design and manufacturing processes in various industries (e.g., automotive, aerospace, shipbuilding, architecture and construction and industrial equipment, and the like) require a significant amount of storage space for auto-generated files. 2D/3D Computer Aided Design (CAD) and Computer Aided Manufacturing (CAM) files are created and stored in different views and forms at different stages. Similarly other industries, such as medicine and entertainment; create and store various views, forms and stages of data for images and videos files.

Most of these files are auto-generated based on a certain original input file (i.e., reference file) and a number of transform functions and parameter information. Generally, the transform functions and parameter information may include various functions, such as vector functions (e.g., scale, adjust, color and/or the like), projections, filters, views, textures and/or the like. For example, CAD (computer aided design) files and CAM (computer-aided manufacturing) files represent designs for various structures (e.g., buildings, mechanical components and the like) in which each design is simply a transformation of a reference design (file) using various parameters.

The data files (e.g., auto-generated files, vector graphics files and/or the like) consume a significant amount of resources in terms of time, space and network bandwidth during performance storage management operations, such as in back-up and archiving operations. Moreover binary comparison techniques are unable to work on various instances because the data obtained out of the applying the transform functions and parameter information on the reference file (i.e., original input file) result in a new data file.

Therefore, there is a need in the art for a method and apparatus for processing a transform function, a reference file and parameter information that represent data files in order to achieve a reduction of an amount of storage space required for backup and restoration of the data files.

SUMMARY OF THE INVENTION

Embodiments of the present invention comprise a method and apparatus for processing a transform function, a reference file and parameter information that represent data files. In one embodiment, a method for using a transform function and parameter information to reduce an amount of storage space associated with data files comprising processing at least one data file to identify a reference file, a transform function and parameter information and storing the transform function and the parameter information, wherein the transform function and the parameter information is applied to the reference file to create the at least one data file.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
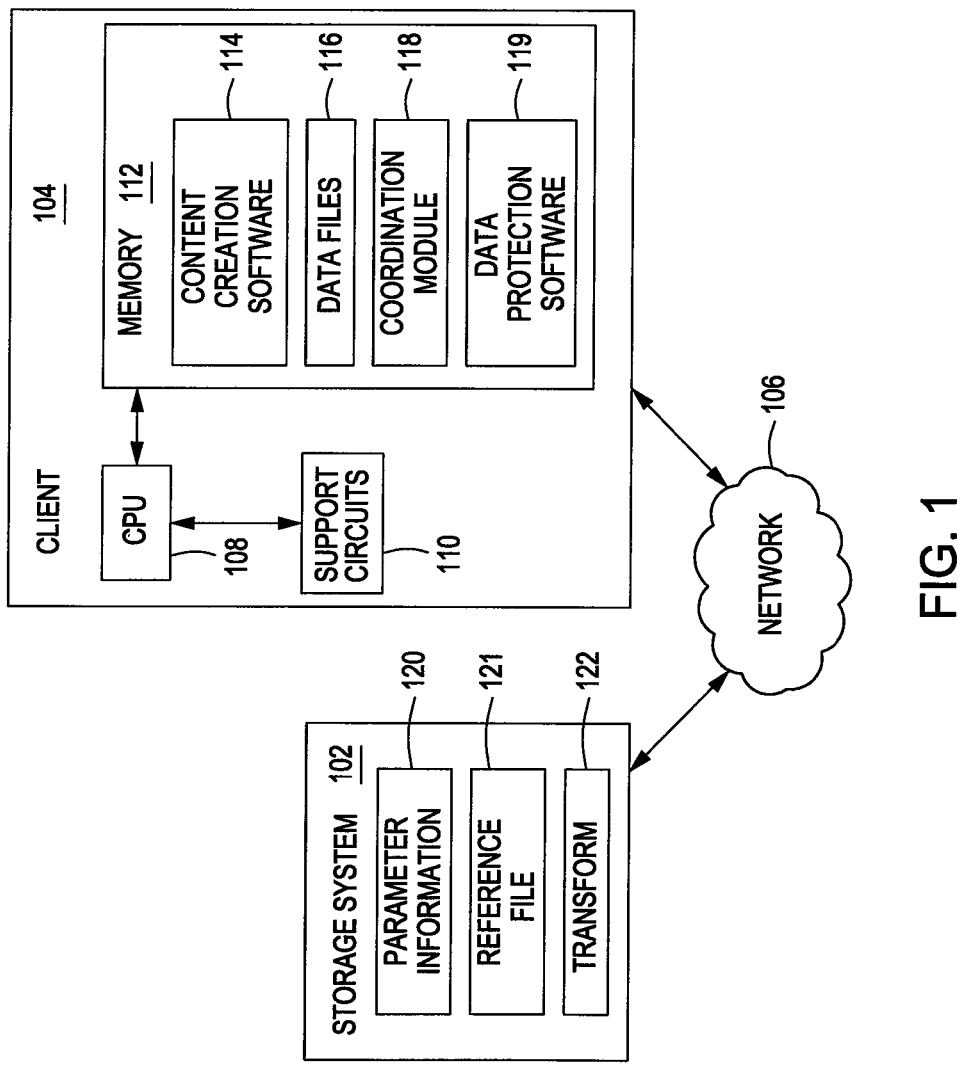
FIG. 1 is a block diagram of a computing device in accordance with one or more embodiments of the present invention.

FIG. 1 is a block diagram of a computing device in accordance with one or more embodiments of the present invention. The system 100 includes a storage subsystem 102 and a client 104, coupled to each other through a network 106. The storage subsystem 102 includes various data storage devices, such as optical storage drives (CD, DVD), magnetic tape drives, hard disk drives, storage arrays (e.g., a RAID configuration) and/or the like. The storage subsystem 102 may form a portion of a Storage Area Network (SAN). The storage subsystem 102 further includes parameter information 120 and a transform function 122. As explained below, the parameter information 120 and the transform function 122 are used to represent auto-generated data during archival, backup and/or restoration.

The client 104 is a computing device (e.g., laptop, desktop, Personal Digital Assistant (PDA)) that comprises a Central Processing Unit (CPU) 108, support circuits 110, and a memory 112. The CPU 108 may comprise one or more conventionally available microprocessors. The various support circuits 110 are well known circuits used to promote functionality of the CPU 108. Such circuits include but are not limited to a cache, power supplies, clock circuits, input/output (I/O) circuits, and the like. The memory 112 is coupled to the CPU 108 and may comprise Random Access Memory (RAM), Read Only Memory (ROM), removable disk memory, flash memory, and various combinations of these types of memory. The memory 112 is sometimes referred to as main memory and may, in part, be used as cache memory or buffer memory. The memory 112 further includes various software packages, such as content creation software 114, a coordination module 118 and data protection software 119. The memory 112 further includes various data, such as data files 116.

The network 106 comprises a communication system that connects a computer system by wire, cable, fiber optic and/or wireless link facilitated by various types of well-known network elements, such as hubs, switches, routers, and the like. The network 106 may employ various well-known protocols to communicate information amongst the network resources.

For example, the network 106 may be a part of the internet or intranet using various communications infrastructure such as Ethernet, WiFi, WiMax, General Packet Radio Service (GPRS), and the like.

In one embodiment, the content creation software 114 (e.g., a tool) is configured to provide the data files 116, such as design files, image files, video files and/or the like, to support small or large scale industrial projects. For example, a structural design file defines details of a structure (e.g., a building) that may be modeled using the content creation software 114. In one embodiment, the design file comprises a structure file generated by the CAD/CAM software. The data files 116 may or may not be auto-generated. One or more embodiments of the present invention described herein may be applied to files that are not auto-generated but may be represented by the transform function 120 and the parameter information 122, such as vector files (i.e., vector graphics files). As used herein, the vector files refer to files that comprise data in a vector format.

The data files 116 (e.g., auto-generated files) may be provided using the transform function 122, the reference file 121 and the parameter information 120. For example, when an image is to be transformed to a different color, the transform function is the color transform, the parameter information 120 includes the details of the color and the reference file 121 associated with the image itself. In another example with respect to medical images, fast-Fourier transforms, wavelet transforms and/or the like are applied to convert time signal representation of the image to the frequency domain. Also parameter information 120, such as grey scale intensity of each pixel, noise levels and/or the like, that may also be extracted from the image. The transform function 120 may also be a geometric transformation (e.g., scale, rotate, skew and/or the like).

The coordination module 118 is configured to identify the transform function 122 and the parameter information 120 for each of the data files 116. In a further embodiment, the coordination module 118 is configured to identify the content creation software 114 (e.g., a tool used to generate the data files 116). Generally, the tool is an application that generates and/or manages the data files 116. The coordination module 118 queries the tool to obtain various information, such as information embedded in the data files 116 and information stored by the tool in a well-known database. In one embodiment, the coordination module 118 queries the tool to identify the transform function 122 and the parameter information 120. For example, if the data files 116 include an image file, the coordination module 118 is configured to identify the transform function used on the image. The coordination module 118 is also configured to extract parameter information 120, such as gray scale intensity, noise levels, and the like. In other embodiment, the coordination module 118 queries the tool to identify the reference file 121. For example, the coordination module 118 identifies the reference file 121 based on a size or a type of the reference file 121.

The data protection software 119 is configured to back up the transform function 122 and the parameter information 120 on the storage subsystem 102. The transform function 122 and the parameter information 120 may be transmitted to the storage subsystem 102 via the network 106. In another embodiment, the data protection software 119 stores the reference file 121. In an embodiment, the data protection software 119 is configured to restore the data files 116 by retrieving the transform function 122 and the parameter information 120 from the storage subsystem 102.

Figure 2:
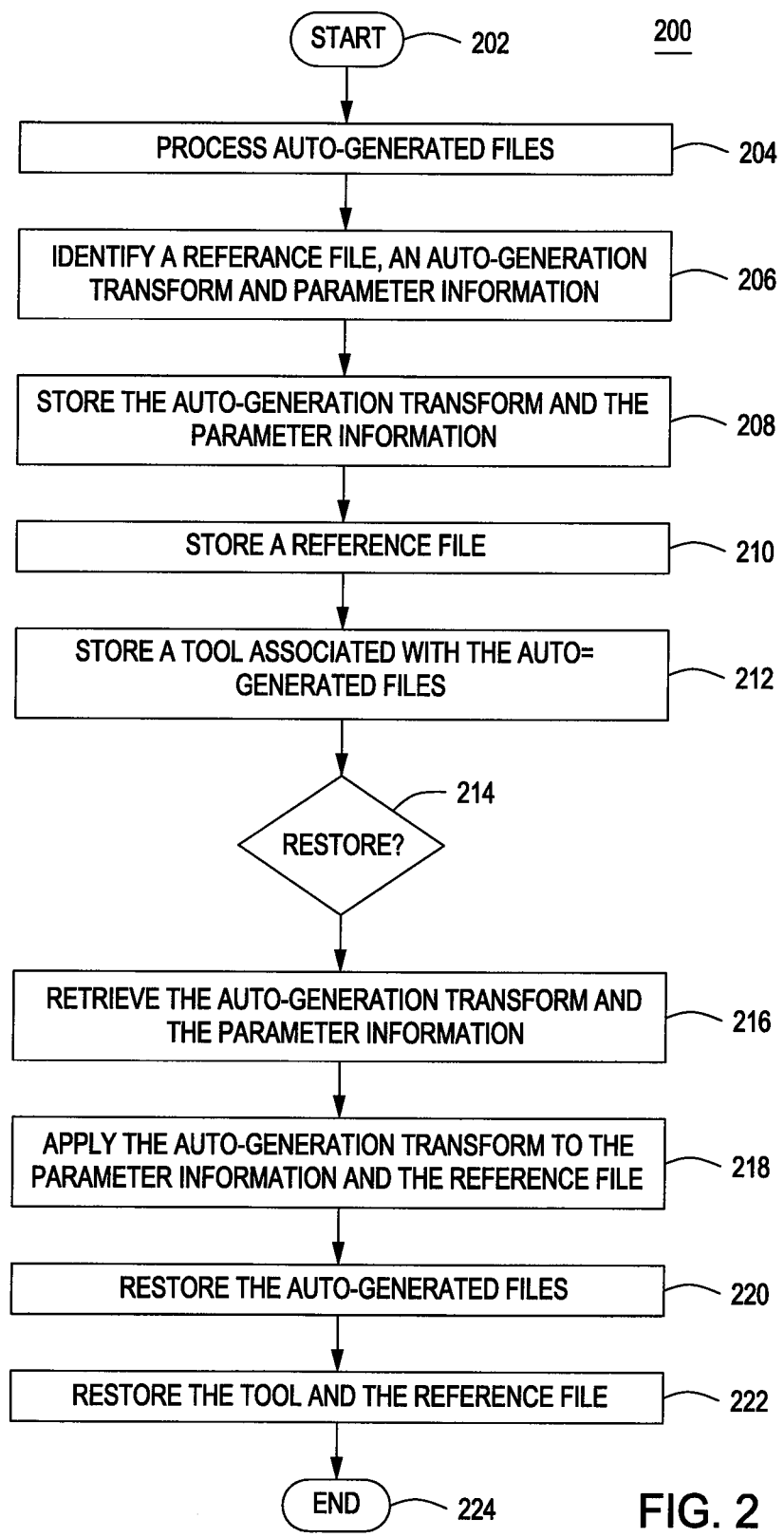
FIG. 2 is a flow diagram of a method for storing a file in accordance with one or more embodiments of the present invention.

FIG. 2 is a flow diagram of a method 200 for processing an auto-generation transform and parameter information associated with auto-generated files in accordance with one or more embodiments of the present invention. The method 200 starts at step 202 and proceeds to step 204, at which auto-generated files (e.g. the data files 116) are processed. At step 206 a reference file, a transform function (e.g. the transform function 122) and parameter information (e.g. the parameter information 120) is identified. At step 208, the transform function and the parameter information is stored in a storage subsystem (e.g. the storage subsystem 102) during a backup process. At step 210, the reference file is also stored during the backup process. At step 212, a tool associated with the auto-generated files is also stored. In some embodiments, steps 210 and 212 are optional steps. Furthermore, the auto-generated files may be backed up without the reference file and/or the tool.

At step 214, a determination is made whether one or more of the auto-generated files are to be restored. If one or more of the auto-generated files are to be restored (option "YES") then the method 200 proceeds to step 216. If the one or more of the auto-generated files are not to be restored (option "NO") then the method 200 proceeds to step 224. At step 216, the transform function and the parameter information is retrieved. At step 218, the transform function and the parameter information are applied on the reference file. At step 220, the auto-generated files are restored. At step 222, the tool and the reference file and/or the tool are restored. The method 200 proceeds to step 224 at which the method 200 ends. In an embodiment, by storing only the transform function and the parameter information, the space required to store a significant number of the auto-generated files is reduced.

Figure 3:
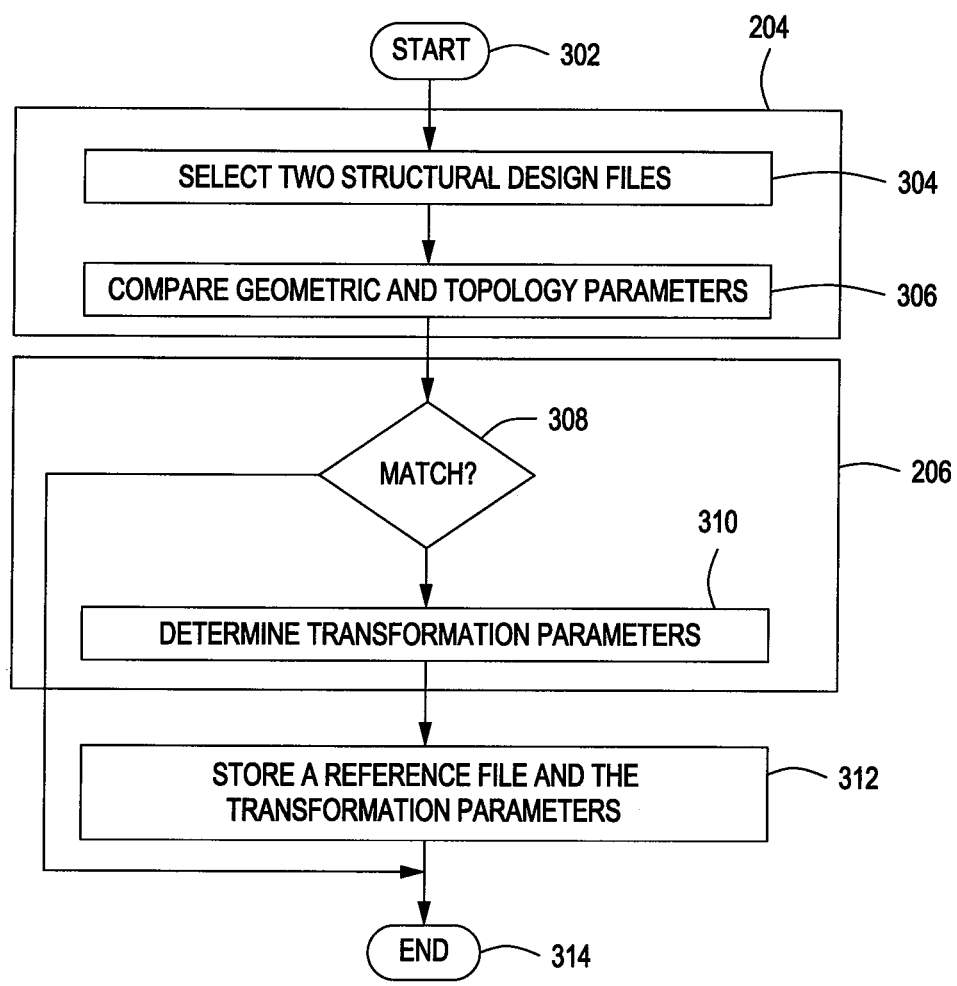
FIG. 3 is a flow diagram of a method for reducing a size of a file for storage in a storage sub-system in accordance with one or more embodiments of the present invention.

FIG. 3 is a flow diagram of a method 300 for reducing a size of a file for storage in a storage sub-system in accordance with one or more embodiments of the present invention. The method 300 starts at step 302 and proceeds to step 304 at which, two structural design files are selected. In an embodiment, the structural design files include CAD/CAM files. At step 306, geometric parameters and topology parameters are compared. In an embodiment, the geometric parameters may include a type and a number of one or more geometric entities and the topological parameters may include information on a relationship between one or more geometric entities, and the like. In an embodiment of the present invention, the step 304 and the step 306 provide the functionality of the step 204 of the method 200. At step 308, a determination is made whether there is a match between two files exists. If a match between two files exists (option "YES"), then the method 300 proceeds to step 310. In an embodiment, a match exists if the first structural design file and the second structural design file is a part of the same design. If a match between two files does not exists (option "NO"), then the method 300 proceeds to step 314. At step 310, transformation parameters are determined. In one embodiment, the transformation parameters are computed by applying a transform function to the geometric parameters and the topological parameters. At step 312, the transformation parameters and a reference file (e.g., a first structural design file) is stored. The method 300 proceeds to step 314 at which the method 300 ends.

The above described embodiments of the invention offer various advantages, such as effective storage of large data files as well as efficient restoration of such large data files. Since only the transform function and the parameter information are used to store the file in the storage sub-system, the size required to the store the file is substantially reduced. Thus, for an image that is to be stored in various colors, only the original image (e.g., reference image), the transform function (e.g., a color change transform) and the parameter information (i.e., various colors) are to be stored as opposed to storing the same image in different colors. In another embodiment, for an image sequence, only a first image (e.g., reference image) and one or more transformation parameters (e.g., motion vectors) are to be stored.

While the foregoing is directed to embodiments of the present invention, other and further embodiments of the invention may be devised without departing from the basic scope thereof, and the scope thereof is determined by the claims that follow.

The invention claimed is:

1. A method comprising:
processing at least one data file, wherein
the at least one data file comprises first image data that represents a first graphic design, and
the processing comprises:
determining a reference file, a transform function, and parameter information, wherein the determining comprises
identifying the reference file, wherein
the reference file comprises second image data that represents a reference graphic design,
determining the transform function by comparing the first image data and the second image data, wherein
the transform function is configured to transform the reference graphic design into the first graphic design, and
extracting the parameter information from the first graphic design, wherein
the parameter information identifies at least one graphic difference between the first graphic design and the reference graphic design, and
the parameter information is configured to be used by the transform function to transform the reference graphic design into the first graphic design, and
querying content creation software to identify the reference file, the transform function, and the parameter information, wherein
the content creation software is configured to generate the at least one data file, and
the content creation software is configured to store identifying information used to identify the reference file, the transform function, and the parameter information;
storing the transform function and the parameter information in a backup storage subsystem during a backup process, wherein
the transform function and the parameter information require less storage space than the at least one data file, and
the transform function and the parameter information are configured to facilitate restoration of the at least one data file by virtue of being configured to be applied to the reference file; and
restoring the at least one data file to a client computing system, wherein the restoring comprises
applying the transform function and the parameter information to the reference file, and
the applying creates the at least one data file.

2. The method of claim 1, wherein the at least one data file represents at least one structural design file.

3. The method of claim 1, wherein the processing the at least one data file further comprises comparing the parameter information of a first structural design file with the parameter information of a second structural design file.

4. The method of claim 3, wherein the processing the at least one data file further comprises determining a match between the parameter information of the first structural design file with the parameter information of the second structural design file.

5. The method of claim 4, wherein the processing the at least one data file further comprises computing at least one transform function between the first structural design file and the second structural design file.

6. The method of claim 1, wherein the processing the at least one data file further comprises:
identifying the content creation software used to generate the at least one data file.

7. The method of claim 6, further comprising
restoring the content creation software and the reference file.

8. The method of claim 1, wherein the querying the content creation software further comprises
identifying the reference file based at least one of a size or a type.

9. A non-transitory computer readable medium having stored therein a set of instructions that, when executed, implement:
a coordination module configured to process at least one data file, wherein
the at least one data file comprises first image data that represents a first graphic design, and
the coordination module is further configured to wherein
determine a reference file, a transform function, and parameter information, wherein determining the reference file, the transform function, and the Parameter information comprises
identifying the reference file, wherein
the reference file comprises second image data that represents a reference graphic design,
determining the transform function by comparing the first image data and the second image data, wherein
the transform function is configured to transform the reference graphic design into the first graphic design, and
extracting the parameter information from the first graphic design, wherein
the parameter information identifies at least one graphic difference between the first graphic design and the reference graphic design, and
the parameter information is configured to be used by the transform function to transform the reference graphic design into the first graphic design, and
query a content creation module to identify the reference file, the transform function, and the parameter information, wherein
the content creation module is configured to generate the at least one data file, and
the content creation module is configured to store identifying information used to identify the reference file, the transform function, and the Parameter information;
a data protection software module, wherein
the data protection software module is configured to
store the transform function and the parameter information in a backup storage subsystem during a backup process, wherein
the transform function and the parameter information require less storage space than the at least one data file; and the content creation module, wherein
the content creation module is configured to
restore the at least one data file to a client computing system, wherein
the content creation module is further configured to apply the transform function and the parameter information to the reference file, and
application of the transform function and the parameter information to the reference file creates the at least one data file.

10. The apparatus of claim 9, wherein the coordination module is further configured to determine a match between the parameter information of a first structural design file with the parameter information of a second structural design file.

11. The apparatus of claim 10, wherein the coordination module is further configured to compute at least one transformation parameter between the first structural design file and the second structural design file.

12. The apparatus of claim 11, wherein the data protection software module is further configured to store the first structural design file as the reference file and to store the at least one transformation parameter, wherein the at least one transformation parameter is applied to the reference file to restore the second structural design file.

13. The apparatus of claim 9, wherein the transform function is configured to restore the first image data of the at least one data file by operating on the second image data of the reference file according to the parameter information.

14. A system comprising:
a storage subsystem comprising a backup memory; and
a client coupled to the storage subsystem comprising:
a processor; and
a memory, coupled to the processor and configured to store instructions executable by the processor, wherein the instructions are configured to implement
a coordination module configured to process at least one data file, wherein
the at least one data file comprises first image data that represents a first graphic design, and
the coordination module is further configured to
determine a reference file, a transform function, and parameter information, wherein determining the reference file, the transform function, and the parameter information comprises
identifying the reference file, wherein
the reference file comprises second image data that represents a reference graphic design,
determining the transform function by comparing the first image data and the second image data, wherein
the transform function is configured to transform the reference graphic design into the first graphic design, and
extracting the parameter information from the first graphic design, wherein
the parameter information identifies at least one graphic difference between the first graphic design and the reference graphic design, and
the parameter information is configured to be used by the transform function to transform the reference graphic design into the first graphic design; and
query a content creation module to identify the reference file, the transform function, and the parameter information, wherein
the content creation module is configured to generate
the at least one data file, and
the content creation module is configured to store identifying information used to identify the reference file, the transform function, and the parameter information
a data protection software module, wherein
the data protection software module is configured to
store the transform function and the parameter information on the storage subsystem during a backup process, wherein
the transform function and the parameter information require less storage space than the at least one data file, and
the content creation module, wherein
the content creation module is configured to
restore the at least one data file to a client computing system, wherein
the content creation module is further configured to apply the transform function and the parameter information to the reference file, and
application of the transform function and the parameter information to the reference file creates the at least one data file.

15. The system of claim 14, wherein the coordination module is further configured to determine a match between the parameter information of a first structural design file with the parameter information of a second structural design file.

16. The system of claim 15, wherein the coordination module is further configured to compute at least one transformation parameter between the first structural design file and the second structural design file.

17. The system of claim 16, wherein the data protection software module is further configured to store the first structural design file as the reference file and to store the at least one transformation parameter, wherein the at least one transformation parameter is applied to the reference file to create the second structural design file.

18. The system of claim 14, wherein the transform function and the parameter information stored on the storage subsystem represent the at least one data file.

19. The method of claim 1, wherein the first graphic design comprises the reference graphic design in a different color.

20. The method of claim 1, wherein the transform function comprises at least one of a geometric transform function, a color transform function, a vector transform function, a texture transform function, a projection transform function, a fast-Fourier transform function, or a wavelet transform function.

21. The method of claim 1, wherein the parameter information comprises at least one of a grayscale intensity of each pixel of the first graphic design, one or more noise levels, one or more colors, topology information, geometric entities, or motion vectors.

22. The method of claim 1, wherein the restoring further comprises
retrieving the transform function and the parameter information from the backup storage subsystem, in response to a determination that the at least one data file is to be restored, wherein
the applying uses the transform function and the parameter information retrieved from the backup storage subsystem.

23. The method of claim 1, further comprising determining a transform function by comparing the first image data and the second image data.

24. The method of claim 1, wherein the content creation software is configured to store the information in a database.

\* \* \* \* \*